July 8, 1958
A. VOORHIES, JR., ET AL
2,842,482
HYDROFORMING PROCESS
Filed May 24, 1954
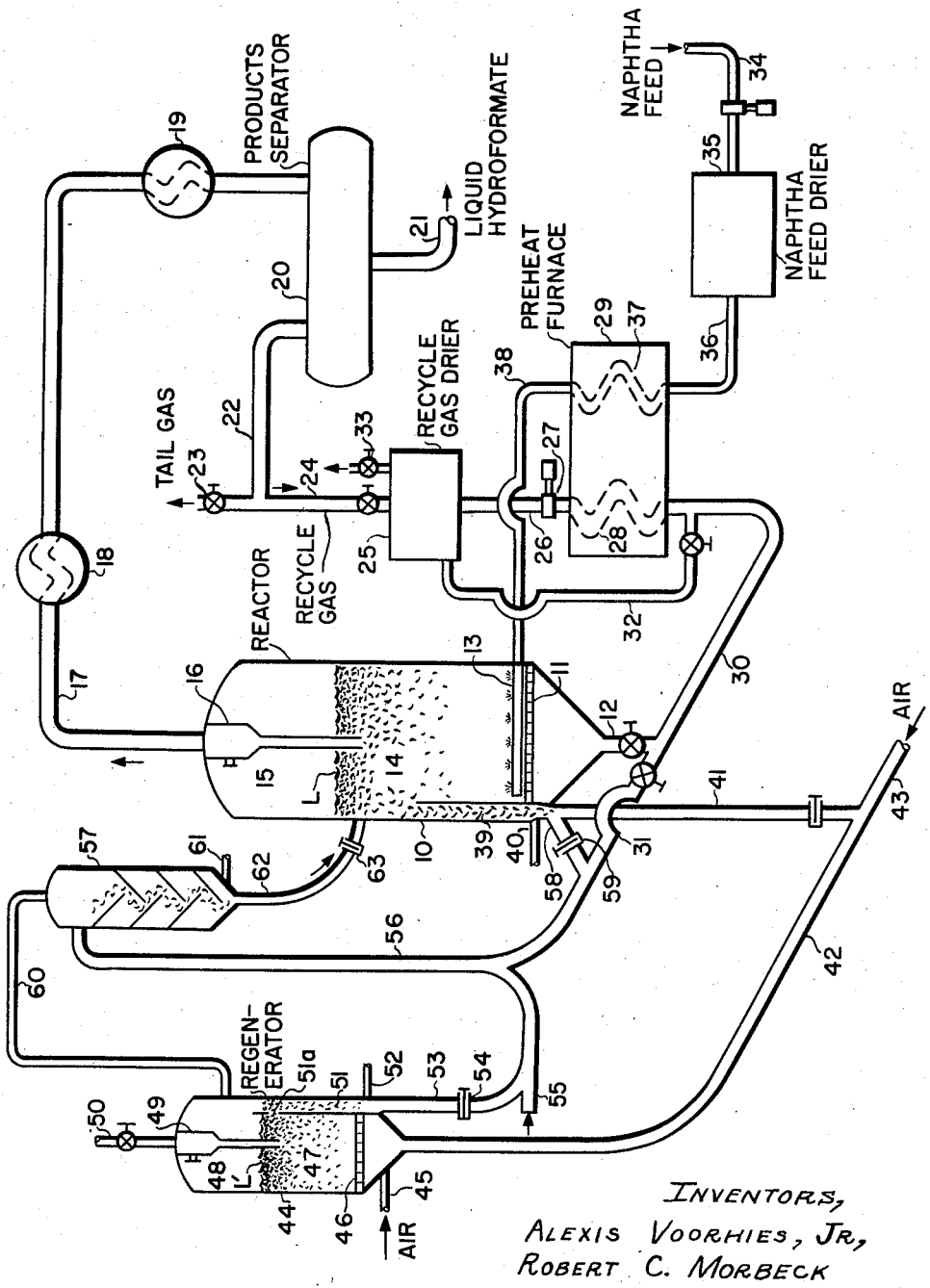
INVENTORS,
ALEXIS VOORHIES, JR,
ROBERT C. MORBECK

United States Patent Office 2,842,482
Patented July 8, 1958

2,842,482
HYDROFORMING PROCESS

Alexis Voorhies, Jr., Baton Rouge, La., and Robert C. Morbeck, Fanwood, N. J., assignors to Esso Research and Engineering Company, a corporation of Delaware Application May 24, 1954, Serial No. 431,776

7 Claims. (Cl. 196—50)

The present invention pertains to the catalytic conversion of hydrocarbons and more particularly to the catalytic reforming or hydroforming of hydrocarbon fractions boiling in the motor fuel or naphtha range of low octane number into high octane number motor fuels rich in aromatics by the fluidized solids technique.

It is known that petroleum naphthas can be subjected to a reforming treatment to yield liquid products boiling within the naphtha or motor gasoline boiling range and possessing improved octane numbers and better engine cleanliness characteristics. A well known and widely used method for upgrading petroleum naphthas is called hydroforming. In hydroforming, the naphtha feed stock is treated at elevated pressures of from 15 to 1000 pounds per square inch and at temperatures of 750°–1050° F. in the presence of solid catalyst particles and hydrogen or recycle gas rich in hydrogen. A variety of reactions including dehydrogenation, paraffin and naphthene isomerization, cyclization or aromatization, hydrogenation and hydrocracking occur during hydroforming.

Catalysts that have been used in hydroforming include metals such as platinum and palladium as well as oxides and sulfides of group VI metals, particularly molybdenum, chromium, vanadium and tungsten. These catalytic components are usually supported upon a base or spacing agent, preferably on an adsorptive or high surface area alumina-containing composition such as various activated aluminas, alumina gel, zinc aluminate spinel and the like.

It has been proposed to effect the hydroforming of naphtha fractions in a fluidized solids reactor system in which the naphtha vapors are passed continuously through a dense, fluidized bed of finely divided hydroforming catalyst particles in a reaction zone, spent catalyst being withdrawn continuously from the dense bed in the reaction zone and passed to a separate regeneration zone where inactivating carbonaceous deposits are removed by combustion, whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels can be designed for single rather than dual functions, (3) the reactor temperature is substantially constant throughout the reactor dense bed, and (4) the regeneration or reconditioning of the catalyst may be readily controlled to maintain catalyst activity and selectivity at a substantially constant level rather than fluctuating over a relatively wide range.

Early hydroforming work in fixed-bed reactors indicated that the use of a catalyst consisting essentially of molybdenum oxide or zinc aluminate spinel at 50 pounds per square inch gave up to 7% more $C_5+$ naphtha yield than is obtained when using a conventional catalyst consisting essentially of molybdenum oxide on an adsorptive alumina at 200 pounds per square inch for the same octane level. This differential or higher selectivity of the molybdic oxide on zinc aluminate spinel would be of extreme importance in a commercial fluid hydroforming operation. For example, in a commercial unit of moderate capacity running, say, 15,000 barrels of feed per day, a 7% yield advantage would mean a gain of over a thousand barrels per day of high octane number product. This difference was found to be much less, however, when it was attempted to use molybdic oxide on zinc aluminate spinel catalyst particles in a continuous fluid hydroforming unit. This result appears especially confusing since it was found that molybdic oxide on alumina catalysts gave as good or better results in a fluid type operation than were obtained with the same catalyst in a fixed bed operation.

It is the object of this invention to provide the art with an improved method of operating a fluidized solids hydroforming reactor system using molybdenum oxide on zinc aluminate spinel as the catalyst.

It is a further object of this invention to improve the selectivity of molybdenum oxide on zinc aluminate spinel catalysts when used in a continuous hydroforming reaction process involving the use of the fluidized solids technique.

These and other objects will appear more clearly from the detailed specification and claims which follow.

It has now been found that a molybdenum oxide on zinc aluminate spinel catalyst may be used to greatest advantage in a fluidized solids reactor system by operating the system under essentially dry conditions. By operation under essentially dry conditions is meant not only avoiding the introduction of stripping steam into the reactor vessel but particularly minimizing water in the system by removing water from the naphtha feed, by reducing the water content of the recycle gas which is circulated through the reactor, and especially that which is used for pretreating or conditioning the freshly regenerated catalyst preparatory to returning it to the reactor, avoiding or minimizing the use of steam as stripping gas in the stripping of spent as well as regenerated catalyst and also by eliminating water formed during regeneration as well as in the pretreatment or partial reduction of the regenerated catalyst by stripping the regenerated and/or pretreated catalyst with a dry gas. By operating the system under essentially dry conditions using the above expedients, it is possible to maximize the selectivity characteristics of a molybdenum oxide on zinc aluminate spinel catalyst in a fluidized solids system.

The accompanying drawing is a diagrammatic illustration of a reactor system for carrying out the process in accordance with the present invention.

In the drawing, 10 is a reactor vessel which may desirably be a vertical cylindrical vessel of considerable length or height and which is provided with a horizontal plate or grid 11 or other suitable means for distributing the incoming recycle gas supplied through line 12 over the entire cross-section of the reactor vessel. A spider 13 or other suitable distribution means is arranged for distributing preheated naphtha feed stock uniformly over the entire cross-section of the reactor vessel. The reactor vessel is charged with a reforming catalyst consisting essentially of a group VI metal oxide, preferably molybdenum oxide upon a support or spacing agent consisting of zinc aluminate spinel. The catalyst is in a finely divided form and is maintained as a dense, turbulent fluidized bed 14 by the passage therethrough of the recycle gas and naphtha vapors. The dense, fluidized bed of catalyst has a definite level L, above which there is a dilute or disperse phase 15 comprising small amounts of catalyst entrained in gaseous or vaporous reaction products. The reaction products are taken overhead from reactor vessel 10, preferably after passage through a cyclone separator or the like 16, which serves to knock out entrained catalyst particles from the outgoing product stream. The separated catalyst particles are returned to the reactor dense bed through the dip leg attached to the bottom of the cyclone separator 16.

The reaction products pass overhead from reactor vessel 10 through product outlet line 17 through cooler 18, wherein they may be indirectly heat exchanged with fresh feed or recycle gas and thence passed to cooler 19, wherein the liquid product is condensed, whereupon the products are discharged into separator 20. Liquid hydroformate is withdrawn from separator 20 through outlet line 21 and passed to suitable rerun, stabilization and/or storage facilities.

Recycle gas containing a major proportion of hydrogen and a minor proportion of normally gaseous hydrocarbons is withdrawn from separator 20 through line 22, and the excess may be discarded from the system through valve controlled vent line 23. The recycle gas is then passed via line 24 to recycle gas dried 25, wherein it is contacted with an adsorbent such as alumina gel, silica gel, or the like, which serves to remove the bulk of the water vapor from the recycle gas. Although all the recycle gas is shown as passing to the drier 25, it is also possible to by-pass part of the recycle gas around the drier and dry only that recycle gas which is used in the pretreatment of the regenerated catalyst as will be described hereinbelow. The dried recycle gas is passed via line 26 to compressor 27 and thence through preheat coils 28 in preheat furnace 29. The hot recycle gas is then passed via line 30 to inlet line 12 and thence into the reactor, while a minor proportion may be passed via line 31 to the regenerated catalyst pretreatment as will be described below. In order to regenerate the adsorbent in the recycle gas drier, a small amount of hot recycle gas may be passed via line 32 back into the drier 25 in order to desorb the water, which is then vented from the system through vent line 33. It may be possible in this way to remove all the excess recycle gas from the system, thereby obviating the necessity for vent line 23.

Naphtha is supplied to the reactor system through inlet line 34, pumped through naphtha feed drier 35, and then passed via line 36 to preheat coils 37 in preheat furnace 29. The hot naphtha vapors are then passed via line 38 to the feed distributor 13 in the reactor vessel. As in the case of the recycle gas drier, hot recycle gas may be used to regenerate the naphtha feed drier, or other suitable regenerator means may be used. It will be understood that the driers are ordinarily provided in pairs so that one vessel may be on stream while the other is undergoing regeneration.

Means are provided for the withdrawal of catalyst directly from the dense fluidized bed 14. This may be in the form of a cell or conduit arranged externally of the reactor vessel and connected to the reactor vessel with one or more catalyst withdrawal lines or connectors and a line connecting the top of the cell or conduit with the upper part or disperse phase of the reactor vessel for venting stripping gases, or the withdrawal cell or conduit may be arranged entirely within the reactor vessel as shown at 39 in the drawing. Stripping gas is introduced into the withdrawal conduit through 40. If steam is used as the stripping gas, it is necessary to extend the conduit 39 up into the dilute phase 15 and provide one or more orifices for the passage of catalyst from the dense bed 14 into the conduit. In this way, the steam by-passes the reactor dense bed, thereby minimizing the detrimental effects of this stripping steam upon the reaction.

Stripped, spent catalyst passes downwardly through standpipe 41 and is discharged into transfer line 42 where it is picked up by a stream of air or carrier gas supplied through line 43. Aeration taps may be provided on standpipe 41 to maintain the catalyst particles in fluidized condition and a slide valve or the like is provided near the base of the standpipe to control the discharge of spent catalyst into the transfer line. If the carrier gas supplied through line 43 is air, it is preferred to supply only part of the air necessary for regeneration of the catalyst and to introduce the remainder directly to the regenerator 44 through line 45. Ordinarily about 15 to 40% of the total air required for regeneration is supplied through transfer line 42 while the remaining 85 to 60% is supplied through line 45, thereby minimizing the danger of excessive temperature rise in the transfer line. A perforated plate or grid 46 is desirably arranged at the bottom of the regenerator vessel 44 in order to insure uniform distribution of solids and regeneration gas over the entire cross-section of the regenerator vessel. The velocity of the regeneration gas or air through the regenerator 44 is so controlled as to form a dense, fluidized liquid simulating bed 47 of catalyst particles and gas having a definite level L' with a dilute or disperse phase 48 comprising small amounts of catalyst entrained in regeneration gases thereabove. The regeneration gases pass overhead from the regenerator 44 through a cyclone separator or the like 49 which removes entrained catalyst from the outgoing gases. The regeneration gases essentially free of catalyst particles are discharged via valve controlled outlet line 50 to a waste gas stack or to suitable scrubbing and/or storage means if it is desired to use this gas for stripping or other purposes in the system. In view of the amount of combustible material burned during regeneration and the rate at which burning occurs at system pressures and in the presence of these reforming catalysts, it is ordinarily necessary to provide cooling coils in the regenerator to prevent the regenerator temperature from exceeding a safe, upper limit. A very desirable arrangement is one in which a primary cooling coil is arranged entirely below the dense bed level L' and a secondary cooling coil is arranged partly below and partly above the dense bed level L' to permit adjustment of the heat exchange capacity by simply varying the dense bed level L' in the regenerator.

Regenerated catalyst is continuously discharged from the dense bed 47 into a suitable stripper. The stripper may be arranged externally of the regenerator vessel with suitable connector conduits, or it may comprise a conduit or well member 51 entirely within the regenerator vessel with its upper end extending above the dense bed level L' and with one or more ports or orifices 51A to control the flow of regenerated catalyst into the withdrawal conduit or well. Stripping gas such as air, scrubbed flue gas, nitrogen, or the like, is supplied to the withdrawal conduit 51 at 52 in order to strip off combustion gases from the regenerated catalyst preparatory to recycling the same to the reactor or hydroforming side of the system. The stripping gas is preferably a dry gas in order that water formed during regeneration may be removed to considerable extent.

The stripped, regenerated catalyst particles are discharged from the base of the stripper well into conduit 53, which forms a standpipe for developing fluistatic pressure for facilitating the transfer of the catalyst. A slide valve or the like 54 is provided near the base of the standpipe in order to control the discharge of regenerated catalyst from the standpipe. The regenerated catalyst discharged from the standpipe 53 is picked up with a stream of recycle gas supplied through inlet line 55 and conveyed through riser line 56 to separator-stripper vessel 57. The hydrogen and also the hydrocarbon in the recycle gas reacts with the regenerated catalyst in order to partially reduce the oxidized catalyst to a lower form of oxide, for example, $MoO_3$ is reduced to $MoO_2$ or $Mo_2O_5$ or to mixtures of these lower oxides. If it is desired to lower the temperature of pretreatment or reduction, this can be done by drawing off a side stream of stripped reactor catalyst through line 58 and discharging the same through a slide valve or other flow control means 59 into transfer line 31 where it is picked up by a stream of recycle gas supplied through line 30 and conveyed into riser line 56 where it becomes thoroughly intermixed with the regenerated catalyst. In this embodiment it is preferred to supply an inert gas such as scrubbed flue gas or nitrogen to inlet 55 to serve as a carrier gas for the regenerated catalyst, thereby avoiding reduction of the regenerated catalyst prior to intermixture with relatively cool reactor catalyst. This inert carrier gas will also serve as a diluent permitting the use of smaller or even stoichiometric quantities of hydrogen without producing excessively high water partial pressures in contact with the catalyst.

The pretreated regenerated catalyst or mixture of reactor catalyst and pretreated regenerated catalyst and pretreating gases is discharged into the upper part of separator-stripper 57. The pretreating gases pass overhead from separator 57 through outlet line 60 to a waste gas stack or, if desired, to the disperse phase 48 in regenerator 44 for recovery of any entrained catalyst. Stripping gas, preferably dry, scrubbed flue gas, nitrogen, or the like, is supplied to the bottom of the separator-stripper 57 through inlet line 61 in order to strip off residual water formed during regeneration and/or pretreatment of the catalyst. Baffle means may be arranged to improve countercurrent contact of the ascending stripping gas with the descending catalyst particles. The stripped catalyst particles are discharged from the base of vessel 57 into transfer line 62 and thence through a slide valve 63 back into the reactor vessel 10. Ordinarily it is preferable to discharge the regenerated catalyst into the upper part of the dense, fluidized bed 14.

The essential feature of the present invention is to keep the reaction zone in which hydroforming is being carried out in contact with group VI metal oxides, preferably molybdenum oxide on zinc aluminate spinel supports, as free from water as is possible. This requires the avoidance of the use of steam as the stripping medium wherever that steam can enter the reactor either directly or by adsorption upon the catalyst and through removal or reduction in the amount of water in the recycle gas. Water content of the recycle gas can be lowered by lowering the temperature and/or raising the pressure at which liquid water is separated from the recycle gas in the separator. For example, at 50 p. s. i. g. (worse than at 200 p. s. i. g.) water content of the recycle gas varies with the temperature as follows:

| | Volume percent |
|---|---|
| 100° F | 1.5 |
| 80° F | 0.8 |
| 60° F | 0.4 |
| 50° F | 0.3 |

Additional water may be removed from the recycle gas by the use of bauxite or alumina driers in the recycle gas line. Economically it is preferred to cool only to the temperatures possible with available cooling water and to lower the water content of the recycle gas to the desired level by means of bauxite driers or the like. Maximum water content of the recycle gas is 0.5 volume percent and is preferably kept somewhat below this figure.

Further reduction in the amount of water in the reaction zone is achieved in accordance with the present invention by treatment of the naphtha feed. The naphtha feed can be dewatered quantitatively by a topping distillation just prior to use. Dissolved air is also removed at the same time. It is imperative to remove dissolved air as well as water, since the oxygen in the dissolved air will be converted to water in the reactor. Stripping the feed stock with an oxygen-free inert gas will also remove dissolved water and air. Some loss in light ends will result from this type of operation. An excelsior filter can be used to coalesce very finely suspended water droplets, but will not remove dissolved water or air. One or a combination of these treatments is applied in naphtha feed drier 35 in order to prepare the feed stock for charging to the reaction zone.

Processing of the regenerated catalyst to minimize water carryover to or formation in the reaction zone is of the utmost importance, since water evolved during catalyst reduction physically amounts to more water than would usually be in the feed or recycle gas streams. For example, at 1 catalyst to oil ratio, a gas rate of 4,000 cubic feet of recycle per barrel of feed naphtha, and 10% $MoO_3$ on catalyst, each unit change in valence state of the $MoO_3$ will add 0.9 volume percent $H_2O$ on gas. Accordingly, it is most important to strip off the water formed during regeneration as well as that formed during pretreatment before recycling the regenerated catalyst to the reaction zone. This is readily accomplished in accordance with the present invention by supplying a dry gas for stripping at 52 and at 61 and also by supplying a large volume of inert gas at 55 in order to minimize water partial pressure during pretreatment in riser line 56.

The catalyst used in accordance with the present invention and the preparation thereof is covered in Kearby U. S. Patent No. 2,447,017, dated August 17, 1948. Essentially the catalyst comprises molybdenum oxide supported upon zinc aluminate spinel produced by chemically combining aluminum oxide and zinc oxide in substantially molecular proportions as by reacting sodium aluminate with a solution of a zinc salt such as zinc nitrate or zinc sulfate to form a slurry of precipitated zinc aluminate which is washed, dried and calcined at about 1000°–1200° F. Molybdenum oxide is incorporated or composited with the zinc aluminate either before or after the drying and calcining treatment as by impregnating with a solution of a molybdenum compound such as ammonium molybdate drying and decomposing the ammonium molybdate to molybdic oxide, or molybdic oxide per se may be dry mixed with the zinc aluminate and the mixture heated in order to distribute the molybdic oxide upon the spinel. The catalyst should contain from about 3 to 15 weight percent molybdic oxide, preferably about 10 weight percent. For proper fluidization in the system the catalyst particles should be between 200 and 400 mesh or less than about 100 microns in diameter with a major proportion between 20 and 80 microns in diameter.

The naphtha feed or charging stock to the reactor may be a virgin naphtha, a cracked naphtha, a Fischer-Tropsch naphtha or the like having a boiling range of from about 125° F. to 450° F., or it may be a narrow boiling cut from within this range. As indicated above, the naphtha feed stock must be substantially freed of water as well as of dissolved oxygen or air in order to minimize the introduction of water to the reaction zone.

The feed stock is preheated alone or in admixture with recycle gas to reaction temperature or to the maximum temperature possible while avoiding thermal degradation of the feed stock. Ordinarily preheating of the feed stock is carried out to about 800°–1000° F., preferably about 950° F. Thermal degradation of the feed naphtha at preheat temperatures can be avoided or minimized by limiting the time or residence in the heating coils, transfer and feed inlet lines.

Hydrogen-rich gas is used in the process to pretreat or partially reduce the higher oxides formed during air regeneration of the catalyst and to minimize carbon deposition on the catalyst by passage through the reaction zone. Since there is a net production of hydrogen in the hydroforming process, the make gas may be recycled and used as the hydrogen-rich gas. In accordance with this invention, the amount of water in the recycle gas is kept below 0.5 volume percent.

The recycle gas is preheated to temperatures of about 1000°–1200° F. in suitable preheat coils preparatory to charging to the reaction zone. The recycle gas is circulated through the reactor at a rate of from about 1,000 to about 8,000 cubic feet per barrel of naphtha feed. It is desirable in pretreating the freshly regenerated catalyst to use a large volume of dry, inert, diluent gas in order to minimize water partial pressure on the catalyst during pretreatment. Moreover, in view of the substantial amounts of water in the pretreatment it is advisable to bleed off or reject the off gases from the pretreatment operation from the system.

The hydroforming reactor vessel is operated at temperatures between about 800° F. and 1100° F., preferably at about 950°–1050° F., and at pressures of from atmospheric to 200 pounds per square inch, preferably about 10 to 50 pounds per square inch.

The regenerator is operated at essentially the same pressure as the hydroforming reactor in order to facilitate transfer of catalyst back and forth between the reactor and the regenerator. Regenerator temperature is ordinarily between about 1050° F. and 1200° F. In order to remove any water formed on the catalyst during regeneration, the freshly regenerated catalyst may be stripped by means of a stream of dry air or other dry, inert gas such as nitrogen or scrubbed flue gas preparatory to transferring the regenerated catalyst to the pretreater and the reactor.

The freshly regenerated catalyst is given a pretreat or partial reduction with hydrogen or hydrogen-rich gas before discharging the same into the reactor. As indicated, pretreatment is preferably effected with hydrogen-rich gas which is dry or contains less than 0.5 mol or volume percent water. It is preferred that the recycle gas used for pretreatment be diluted with several volumes of a dry inert diluent gas in order to remove the water formed in the partial reduction of the regenerated catalyst. Pretreatment is preferably effected at temperatures below 1050° F. rather than normal regeneration temperatures in order to avoid overpretreatment or thermal degradation of the catalyst. This reduction in temperature is preferably achieved by mixing relatively cool reactor catalyst or alternatively cooling of the regenerated catalyst by indirect heat exchange with reactor catalyst may be carried out so that the sensible heat of the freshly regenerated catalyst is transferred to the reaction zone. The pretreated catalyst is stripped of water formed during the partial reduction of the catalytic metal oxide by contacting the same with a dry stripping gas such as nitrogen or scrubbed flue gas.

The average residence time of the catalyst in the reactor is of the order of from about 3 to 4 hours, while the average residence time of catalyst in the regenerator is of the order of from about 3 to 15 minutes.

The weight ratio of catalyst to oil or naphtha introduced into the reactor should ordinarily be about 0.5 to about 3.5, preferably about 1.0. Space velocity or the weight in pounds of feed charged per hour per pound of catalyst in the reactor depends upon the age or activity level of the catalyst, the nature of the feed stock, and the nature of the reaction products desired. Space velocity for a 10% molybdenum oxide on zinc aluminate spinel catalyst used for upgrading a narrow boiling virgin naphtha feed may vary from about 0.1 w./h./w. to about 1.0 w./h./w.

The following examples are illustrative of the present invention.

EXAMPLE I

A 200°–330° F. boiling range East Texas virgin naphtha was contacted with a catalyst containing 10 weight percent $MoO_3$ upon a zinc aluminate spinel prepared by reacting a solution of zinc sulfate with a solution of sodium aluminate, washing, spray drying, and calcining to form the spinel. Reactor conditions were 50 pounds per square inch, 900° F. and with 1500 cubic feet of recycle gas passed through the reaction zone per barrel of feed. Several runs were made under essentially the same conditions except that the water content of the hydrogen-rich gas used to pretreat the catalyst and to minimize carbon deposition on the catalyst in the reaction zone was varied. The results obtained are summarized in Table I.

*Table I*

| Run No. | A | B | C |
| --- | --- | --- | --- |
| Pretreat and Process $H_2$ (Vol. percent $H_2O$) | 0.5 | 3.0 | 7.3 |
| Material Balance, Wt. percent | 99.3 | 99.5 | 100.2 |
| Relative Wt. Activity (Dry operation=1.0) | 0.7 | 0.6 | 0.5 |
| Delta $C_6+$, Vol. Percent (Dry yield—wet yield) | 0.0 | −1.0 | −3.0 |

EXAMPLE II

The same feed stock was converted in further experiments with the same catalyst and with a further catalyst of the same composition upon a base prepared by reacting zinc acetate with an alumina hydrosol formed by the hydrolysis of aluminum alcoholate. The same reaction conditions were applied except that 2000 cubic feet/barrel of recycle gas was used instead of 1500 as in Example I. The results obtained are summarized in Table II.

*Table II*

| Catalyst | Zinc Sulfate Sodium Aluminate Base | | Alcoholate Alumina-Zinc Acetate Base | |
| --- | --- | --- | --- | --- |
| Pretreat and Process $H_2$ (Vol. Percent $H_2O$) | 0 | 3 | 0 | 3 |
| At 95 O. N. on $C_5+$: | | | | |
| Vol. Percent 10# RVP Gasoline | 97 | 96 | 96 | 91 |
| Vol. Percent $C_5+$ | 84 | 82 | 82 | 78.5 |
| Vol. Percent $C_4$ | 3 | 4 | 3.5 | 5.5 |
| Wt. Percent Dry Gas | 8 | 7.5 | 9 | 9.5 |
| Wt. Percent Carbon | 0.8 | 1.0 | 0.7 | 1.7 |
| W./H./W. | 0.25 | 0.15 | 0.4 | 0.2 |

These data clearly show the marked advantages to be gained by hydroforming naphtha fractions in contact with zinc aluminate supported catalysts under essentially dry conditions.

The foregoing description contains a limited number of embodiments of the present invention. It will be understood that this invention is not limited thereto, since numerous variations are possible without departing from the scope of this invention.

What is claimed is:

1. A method of upgrading hydrocarbon fractions boiling within the naphtha range in contact with catalysts consisting essentially of molybdic oxide dispersed upon zinc aluminate spinel in a fluidized solids reactor system in which catalyst is continuously circulated from the reaction zone to a regeneration zone where carbonaceous deposits are burned off, whereupon the regenerated catalyst particles are returned to the reaction zone, the improvement which consists of contacting the feed stock with the catalyst in admixture with hydrogen-rich recycle gas under conversion conditions of temperature and pressure in the substantially complete absence of water.

2. The method as defined in claim 1 in which stripping steam is excluded from the reaction zone and the recycle gas supplied to the reaction zone contains less than 0.5 volume percent water.

3. The method as defined in claim 1 in which the feed naphtha is substantially freed of entrained and dissolved water as well as dissolved air prior to charging the same to the hydrocarbon conversion reaction zone.

4. The method as defined in claim 1 in which the catalyst after regeneration is contacted with reducing gas, then stripped of water formed before recycling to the reaction zone.

5. The method as defined in claim 1 in which the water content of the recycle gas is lowered to below 0.5 volume percent and the feed naphtha is substantially freed of entrained and dissolved water as well as dissolved air prior to charging the same to the reaction zone.

6. The method as defined in claim 1 in which the water content of the recycle gas is lowered to below 0.5 volume percent and the feed naphtha is substantially freed of entrained and dissolved water as well as dissolved air prior to charging the same to the reaction zone and the catalyst after regeneration is contacted with reducing gas and then stripped of water before recycling to the reaction zone.

7. The method as defined in claim 1 in which the feed naphtha is substantially freed of entrained and dissolved water as well as dissolved air prior to charging the same to the hydrocarbon conversion reaction zone and the catalyst after regeneration is contacted with reducing gas and then stripped of water before recycling to the reaction zone.

References Cited in the file of this patent

UNITED STATES PATENTS

| | | |
|---|---|---|
| 2,406,112 | Schulze | Aug. 20, 1946 |
| 2,447,017 | Kearby | Aug. 17, 1948 |
| 2,602,771 | Munday, et al. | July 8, 1952 |
| 2,730,556 | Liedholm | Jan. 10, 1956 |